Sept. 13, 1960 C. H. BECKER 2,952,503

METHOD AND APPARATUS FOR MAGNETIC RECORDING AND REPRODUCING

Filed June 13, 1955 5 Sheets-Sheet 1

INVENTOR.
CARL H. BECKER
BY Paul B Hunter
ATTORNEY

INVENTOR.
CARL H. BECKER
BY Paul B. Hunter
ATTORNEY

INVENTOR.
CARL H. BECKER
BY Paul R. Hunter
ATTORNEY

INVENTOR.
CARL H. BECKER
BY Paul B. Hunter
ATTORNEY

Sept. 13, 1960 C. H. BECKER 2,952,503

METHOD AND APPARATUS FOR MAGNETIC RECORDING AND REPRODUCING

Filed June 13, 1955

5 Sheets-Sheet 5

INVENTOR.
CARL H. BECKER
BY Paul B. Hunter
ATTORNEY

United States Patent Office 2,952,503
Patented Sept. 13, 1960

2,952,503

METHOD AND APPARATUS FOR MAGNETIC RECORDING AND REPRODUCING

Carl H. Becker, Los Altos, Calif., assignor to Trionics Corporation, Madison, Wis., a corporation of Illinois Filed June 13, 1955, Ser. No. 514,978

2 Claims. (Cl. 346—74)

The invention relates to improved methods for magnetic recording of intelligence as on tape and reproducing the same, for example, pictures, television signals, data, digital in formation, radiation, etc. Tape recording apparatus, as heretofore generally constructed, is only capable of recording a limited band of frequencies. In the present invention, new apparatus and methods are presented, making it possible to record frequencies from zero up approximately to $10^{20}$ cycles per second. This vastly enlarges the range of use of magnetic recorders. The upper limit of the operating frequency of the present apparatus, i.e., $10^{20}$ cycles per second, is defined as the "annihilation frequency."

This invention employs novel methods and apparatus resulting in essential advantages as compared to known methods; for example, the present methods and apparatus avoids crosstalk, produces substantially no frequency distortion nor phase distortion, no ill gap effects, and substantially eliminates head wear, etc. The apparatus of the present invention preferably employs standard film recording speeds, but is capable of recording and reproducing an extremely wide band of frequencies somewhat analogous to known photographic processes and television recording, without the disadvantages of the known methods.

This invention is based on a newly discovered principle of atomic physics, which I call "radiation magnetization," characterizing a radiomagnetic transducer method, by which permanent magnetization is directly or indirectly induced by direct interaction of radiation with ferromagnetic and paramagnetic material. Radiation magnetization may be defined as a change of the angular momentum of precession of molecular elements (for example, precessing electrons or protons) by means of a torque produced by radiation and applied to the molecular elements. The ferromagnetic precession is defined by the Larmor frequency formula:

$$\bar{\omega}_0 = -\left(\frac{e}{m}\right)\bar{\beta}$$

describing the natural frequency of precession ($\omega_0$) as a function of a magnetic flux density ($\beta$), with ($e$) equal to the molecular element charge and ($m$) equal to molecular element mass. For most operating frequencies up to the annihilation frequency, initial molecular element precession before radiation interaction is preferable. Apparatus is provided for the premagnetization of the ferromagnetic system, such as a tape, with an external magnetic field to accomplish premagnetization.

Radiation magnetization results in a complex magnetic dispersion similar to well-known electric dispersion. Radiation magnetization is composed of a real component, i.e., the actual recorded magnetization, and the imaginary component of radiation magnetization, i.e., radiation absorption, disappearing, for example, as heat (see Fig. 1). According to the general theory of dispersion, the real component of radiation magnetization has positive and negative maxima when the radiation frequency ($\omega$) is near resonance, i.e., the natural frequency of the molecular elements of the tape ($\omega_0$). The absorption of radiation has a maximum at resonance ($\omega=\omega_0$). Similar relations hold for electric dispersion. We will call the case of maximum real radiation magnetization the "tuned" case, while maximum absorption is defined usually as "resonance." The complex relation between radiation magnetization and premagnetization in the area of maximum radiation magnetization or maximum absorption respectively will be called "sensitization," similar to photoelectric and photographic terminology. The procedure of radiation magnetization will be called a radiomagnetic one.

The height of the maximum of radiation magnetization and absorption is determined by the damping of the ferromagnetic or paramagnetic material, as well as by permeability and coercive or hysteresis force. Hence, according to this invention, ferromagnetic material with low losses, high permeability, and high coercive or hysteresis force, will be preferably used, such as ferrites. Ferrites are also preferred, according to this invention, because of their optimum permeability and coercive force in order to decrease demagnetization effects in radiomagnetic recordings and reproductions.

Accordingly, it is the object of this invention to produce radiomagnetic recording from radiation magnetization, for example, through the following methods:

(A) Radiomagnetic interaction of ferromagnetic material with electromagnetic radiation, produced directly by a radiation source producing any one of the following: high frequencies, microwave, infrared, visible light, X-rays, $\gamma$-rays, etc.

(B) Radiomagnetic interaction of ferromagentic material with radiation, produced indirectly by means of displacement or capacitive currents generated by impinging electromagnetic energy of high frequencies, microwave frequencies, infrared or visible light frequencies, X-ray frequencies, $\gamma$-ray frequencies, etc.

(C) Radiomagnetic interaction of ferromagnetic material with an electromagnetic field produced by a coil carrying a periodic electric current of frequencies including the high frequency range and microwave range.

Accordingly, it is another object of this invention to produce radiomagnetic reproduction of radiomagnetic recordings from the following methods:

(D) Radiomagnetic interaction of radiation with the recorded magnetization, as on a tape, resulting in a variation of the input impedance of the irradiating means corresponding to the recorded intelligence.

(E) Electronoptical reflexion of electron beams from recorded magnetization.

(F) Electromagnetic pick-up of recorded magnetization.

Other objects and features of this invention will appear as the description proceeds.

As used herein, I define radiation magnetization as recorded radiation employing recorded frequencies up to 30,000 megacycles, and "photo magnetization" as recorded radiation employing frequencies higher than 30,000 megacycles.

Referring now to the drawings.

Figure 8:
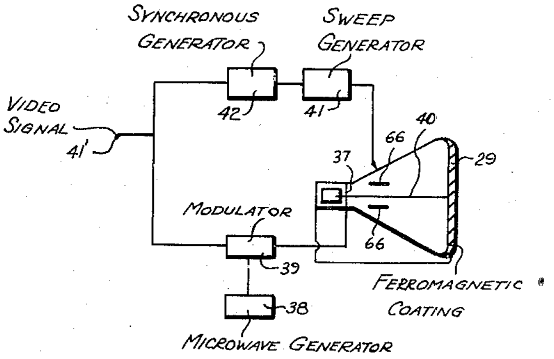
Fig. 8 shows a typical electric circuit for recording intelligence by means of a suitably modulated electron beam.
Figure 8A:
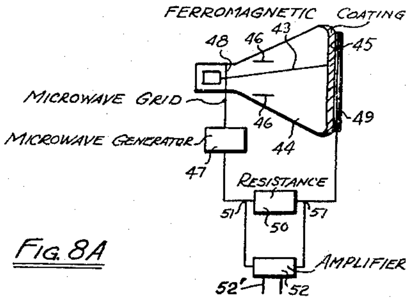
Fig. 8A shows a typical circuit for reproducing intelligence using an electron beam.
Figure 8B:
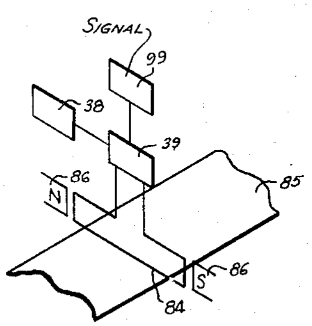

Fig. 8B discloses a method and apparatus for making radiomagnetic recordings.

Figure 8C:
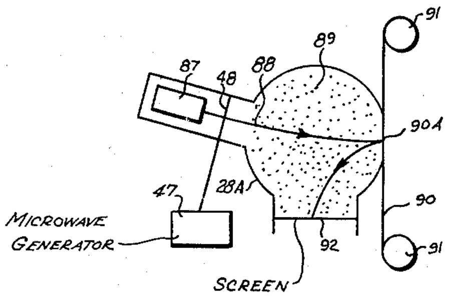
Figure 8D:
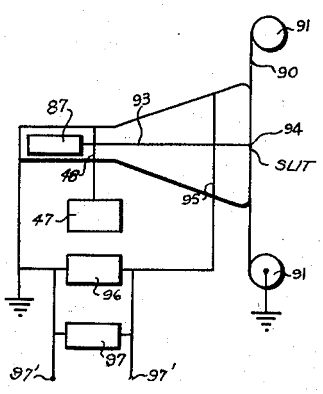

Figs. 8C and 8D illustrate methods of electronoptical reproduction.

Figure 8E:
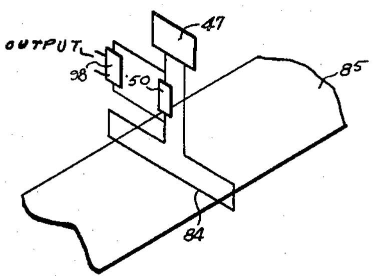

Fig. 8E illustrates a method of electromagnetic pickup reproduction.

Figure 9:
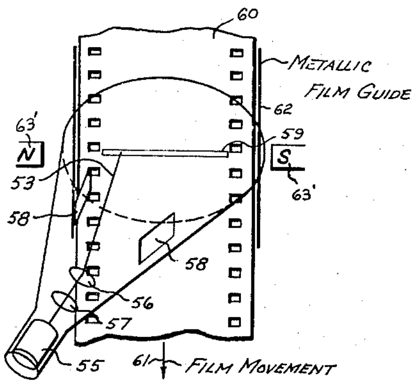

Fig. 9 shows the head for tape recordings by means of an electron beam.

Figure 10:
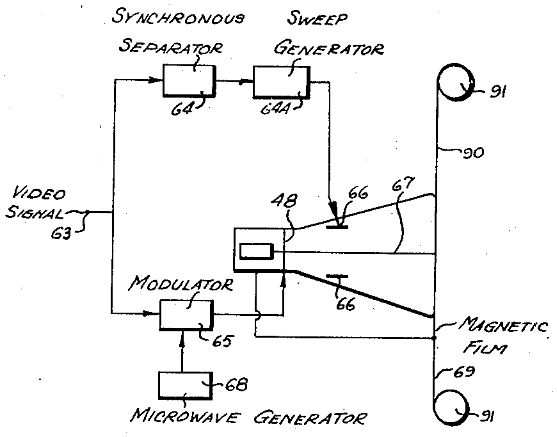

Fig. 10 shows an electric circuit for radiomagnetic tape recording by means of an electron beam.

Figure 11:
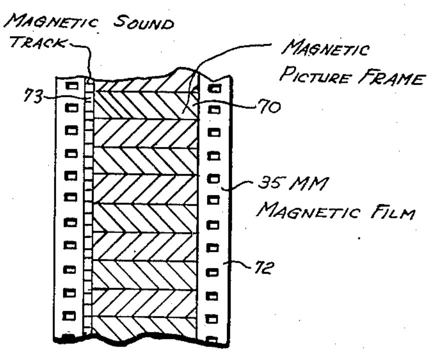

Fig. 11 shows magnetic frames of a radiomagnetic television recording.

Figure 12:
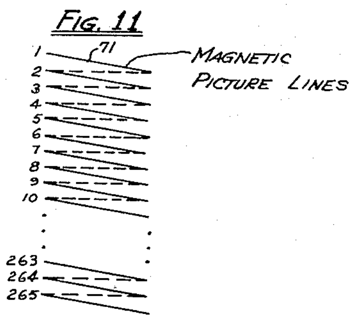

Fig. 12 shows the saw tooth scan of a single radiomagnetic television recording.

Figure 13:
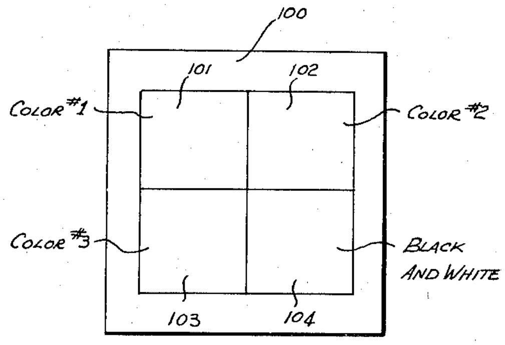

Fig. 13 shows one frame of a radiomagnetic color television recording.

Figures 14, 14A, 15:
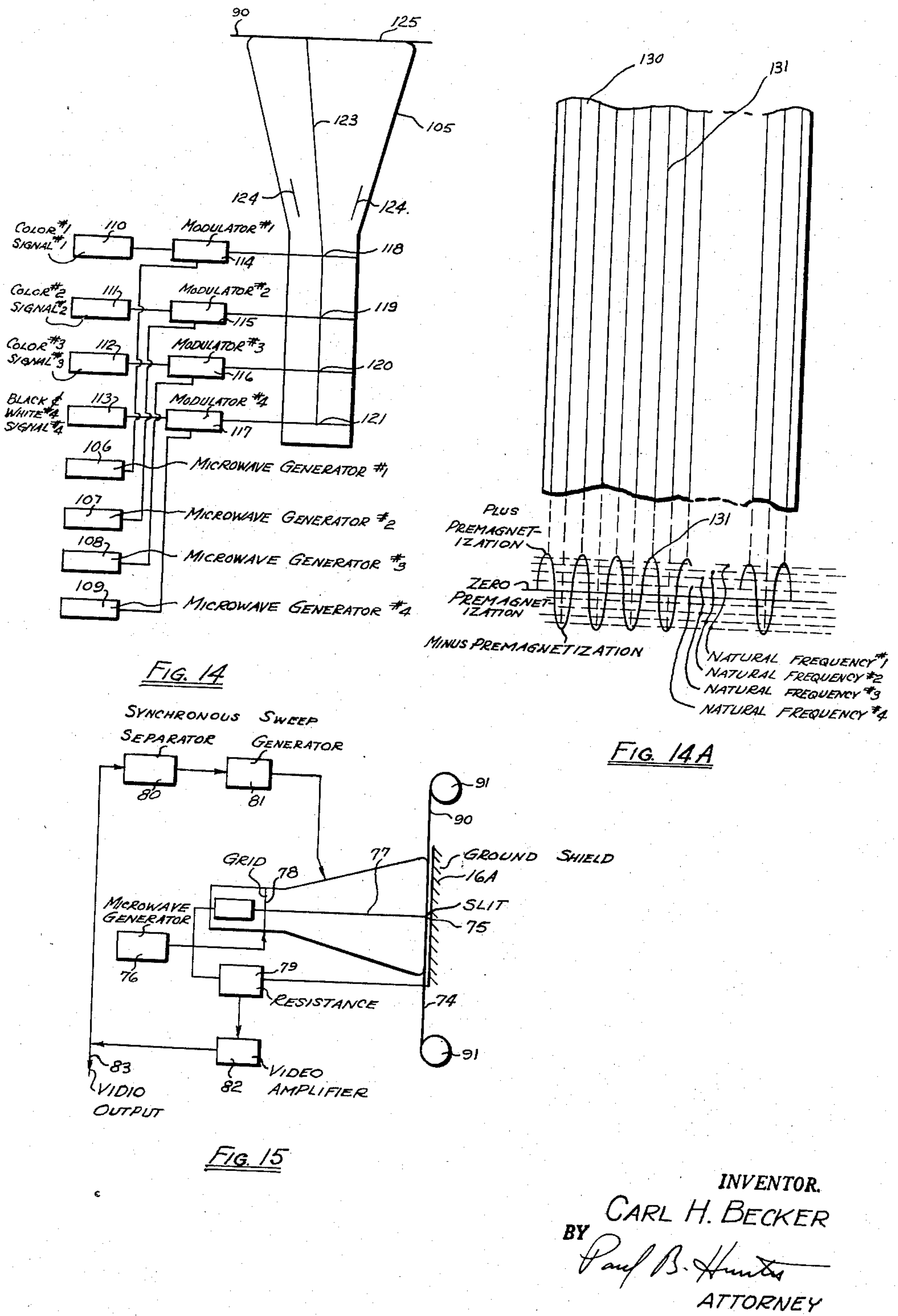

Fig. 14 shows a single track color television recorder.

Fig. 14A shows a premagnetized raster for use with the apparatus of Fig. 14, and Fig. 15 illustrates radiomagnetic television reproduction apparatus.

Figure 1:
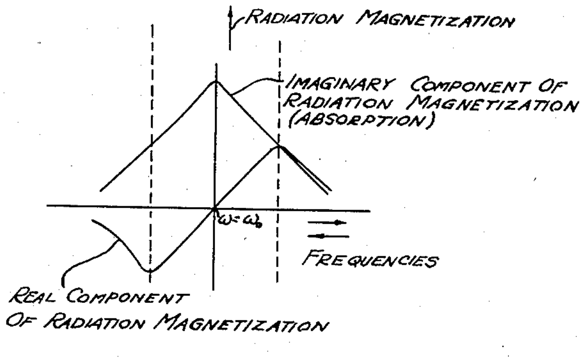
Fig. 1 is a graph showing the real component and the imaginary component of radiation magnetization as a function of radiation frequencies and precession frequencies.
Figure 2:
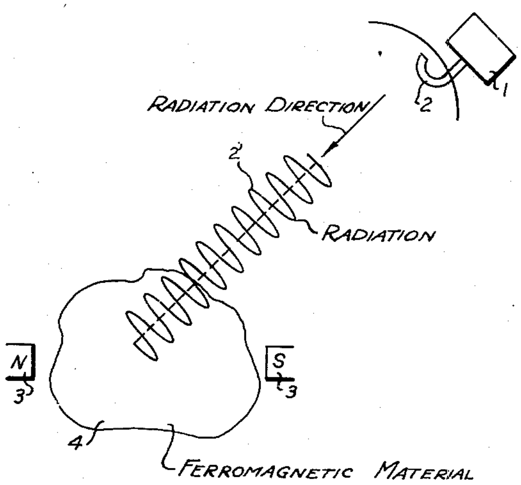
Fig. 2 is a schematic view showing a magnetization recording directly produced by means of high frequency electromagnetic radiation.
Figure 3:
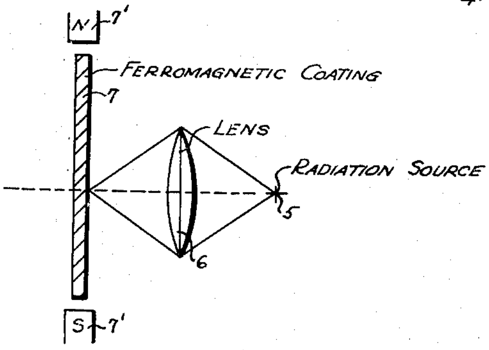
Fig. 3 shows apparatus for producing photomagnetization recordings, directly produced by means of optically controlled radiation.

Referring now specifically to the drawings:

As an embodiment of method (A) of this invention, electromagnetic radiation is applied directly from a source 1 (see Fig. 2), shown as an ultra-high-frequency generator, through directive antenna 2, to a ferromagnetic or paramagnetic material, premagnetized in respect to radiation frequency by means of a fixed magnetic field producing means 3. The strength of the field set up by magnetic means 3 is related to the frequency of emitter 2 through the Larmor frequency formula previously given herein, such that the molecular elements of the recording ferromagnetic material 4 are in a tuned condition resulting in a direct recording of the radiation within the ferromagnetic material. The necessary microwave power emitted from emitter 2 per unit volume to produce maximum radiomagnetic storage and recording in watts per unit volume follows from the divergence of the complex Poynting vector $(\nabla \cdot \bar{S})$:

$$\nabla \cdot \bar{S} = \frac{\omega}{4}\left(\frac{\mu^1}{\mu_0^2}\right)\left(\frac{m}{e}\right)^2 (2\alpha)^2$$

where $\mu^1$=the real component of complex permeability
$\mu_0$=permeability of the vacuum
$\omega$=angular microwave frequency which creates radiomagnetic storage and recording
$m$=electron mass
$e$=electron charge
$2\alpha$=damping constant In the case of infrared or visible light, a photomagnetic process is employed to induce a magnetic recording in a photomagnetically sensitive material, coated or plated on the film or dispersed in the film. Such film may be photomagnetized through exposure to the light of the picture to be recorded photomagnetically, directly magnetizing the photomagnetically sensitive tape. This photomagnetization recording will result in the radiation magnetization of only a very thin path of the ferromagnetic material, sensitized by a superimposed magnetic D.C. field or magnetic A.C. field as well as by molecular sensitization, as determined above. For example, a source of radiation 5 suitably intensity modulated with intelligence (see Fig. 3) is focussed by lens 6 on to the ferromagnetic coating 7 such as a moving magnetically coated tape so that a photomagnetic recording results, similar to ordinary photography. Because of the high value of radiation frequencies in this case, the necessary tuned premagnetization is of a very high Larmor frequency compared to radiation magnetization, for example, with microwaves; hence use of ferromagnetic materials having special molecular photomagnetic sensitization in the frequency range of photomagnetization is necessary in addition to ordinary premagnetization by use of magnet means 7′, used, for example, in the microwave range of precession natural frequencies. Such ultra-high natural precession frequencies exist for example in the infrared range. For example, $Fe_2O_3$ has a natural frequency of approximately $10^{14}$ cycles per second while certain ferrites depending on the Curie temperature of the ferromagnetic material are known with natural frequencies of $3\times10^{13}$ and hence serve as suitable photomagnetic materials.

Figure 4:
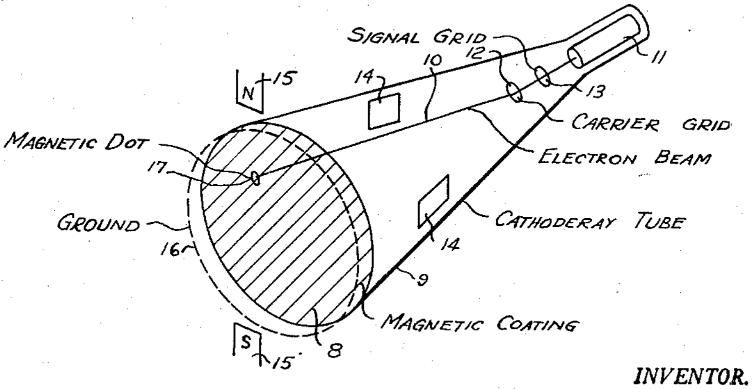
Fig. 4 is a schematic view of a cathode ray type of recording and reproducing head.

As an embodiment of method (B) of this invention, radiation magnetization is induced indirectly by means of displacement currents in a ferromagnetic coating 8 (see Fig. 4) outside or inside a cathode ray tube 9. The displacement currents are generated by an electron beam 10, produced in the cathode ray tube by means of an electron gun 11, the electron beam being modulated through grid 12 with constant carrier microwave frequencies and through signal grid 13 with the signal to be recorded radiomagnetically. Ordinary sweeping of the electron beam is produced by known techniques, for example, by the deflection plates 14 suitably energized, as will further appear. The precession natural frequencies of the magnetic coating are tuned in respect to the microwave frequencies of the carrier, for example, by means of premagnetization with the magnetizing means 15. The displacement currents, generated by the impinging energy of the carrier microwave frequencies of the electron beam, penetrate the ferromagnetic coating 8 carried by a grounded surface 16, resulting in magnetic dot recordings 17 of minute circular magnetic elements in the ferromagnetic coating.

Figure 5:
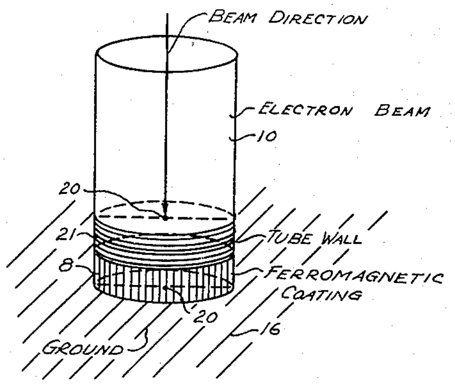
Fig. 5 is an enlarged schematic view of a portion of the electron beam of Fig. 4 and of the associated tube wall and recording medium.
Figure 6:
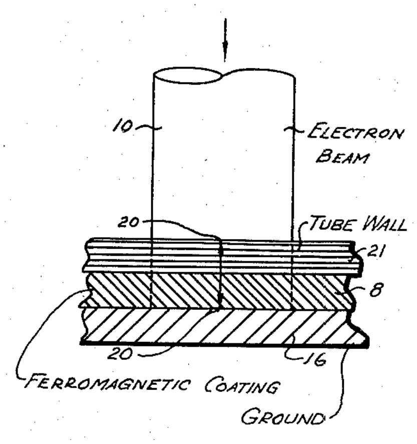
Fig. 6 is a side view of the structure of Fig. 5.

The elementary procedure of radiomagnetic dot recordings may be characterized as being originated by means of an electric force, periodic with the carrier microwave frequency of the electron beam modulation, between the end of the electron beam at 10 and the ground 16 (see Fig. 5) wherein an elementary area of the beam and ground is shown. The periodic electric force acts like a dipole antenna 20, between the end of the beam and ground, producing electromagnetic radiation within the tube wall 21 (in case of ferromagnetic coating outside the cathode ray tube) and the ferromagnetic coating 8. The periodic magnetic flux density of the radiation produces radiation magnetization within the processing ferromagnetic elements of the coating because of radiation interaction with these precessing elements. A side view of the elementary portions of Fig. 5 are shown in Fig. 6, illustrating how the electron beam 10 is virtually continued through the tube wall 21 and the coating 8, ending at the electric ground 16.

From radiation theory we know that the magnetic flux density of radiation from a dipole in the vicinity thereof decreases proportionally to the square of the distance from the dipole. Hence, a sharp decrease of radiation magnetization results outside the displacement current in the ferromagnetic coating, producing sharp magnetic dots, similar to a picture dot of a television tube or a photographic picture. The possibility of recording magnetic dots characterizes another essential method of this invention, permitting recording and reproduction of very small elementary magnetic elements, similar to the photographic elements of ordinary photography.

Figure 7:
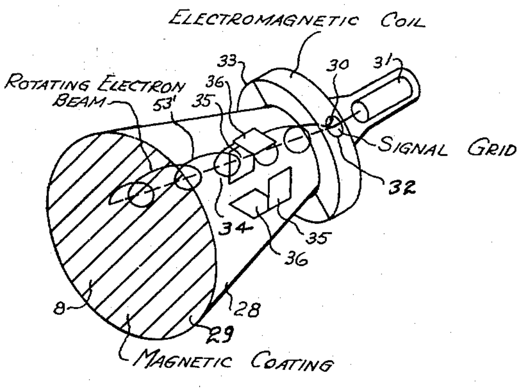
Fig. 7 is a schematic view of a cathode ray type of head using a rotating electron beam.

As another embodiment of method (B) of this invention, radiation magnetization recordings are induced indirectly by means of an electron beam, similar to the arrangement above, but with the electron beam rotating with a microwave carrier frequency and modulated at the same time with the signal to be recorded radiomagnetically. This results in a radiomagnetic dot recording of longitudinal or perpendicular magnetic elements (instead of the circular dots, mainly produced with the dot recording procedure described above). Inside a cathode ray tube 28 (Fig. 7) with an inside or outside ferromagnetic coating 29, an electron beam 30 is produced by an electron gun 31 and modulated at the grid 32 with a signal to be recorded radiomagnetically. A magnetic field, for example produced by means of a coil 33 around the cathode ray tube, produces the beam rotation 34, similar to that in a cyclotron. Hence, the electrons will rotate with the Larmor frequency in the microwave frequency range without a carrier grid as used above, assuming the magnetic flux density from coil 33 producing electron beam rotation corresponds to the Larmor frequency formula above, with ($e$) equal to the electron charge and ($m$) equal to the electron mass. The additional horizontal and/or vertical deflection of the electron beam, for example, by a time base, is produced by the deflection plates 35 and 36.

The electric circuit, used in method (B) of this invention, is characterized in detail by a signal (Fig. 8) to be recorded on ferromagnetic coating 29 from a microwave generator 38 as modulated by means of a modulator 39 and applied to grid 37, modulating the electron beam 40, which is also deflected on a time base through a sweep generator 41 synchronized with a signal by means of a synchronous separator 42.

As an embodiment of this invention in respect to method (C), radiomagnetic recordings may be produced by means of a conducting coil 84 (Fig. 8B) surrounding ferromagnetic material 85 and conducting a periodic current of microwave carrier frequencies from microwave generator 38, combined through modulator 39 with modulation of the signal to be recorded radiomagnetically. If a proper premagnetization by means of magnet 86 sensitizes the ferromagnetic system, as described above, radiation magnetization will be produced by means of the periodic magnetic flux density produced inside the coil 84 upon the ferromagnetic material, producing analog magnetic moments of radiation magnetization as compared to the other embodiments of this invention.

As an embodiment of method (D) of this invention, reproduction of magnetic recordings is fulfilled by radiomagnetic interaction of radiation with the magnetic recordings to be reproduced. This results in impedance variations in the radiation circuit in correspondence to the magnetization variations of the recordings. If the reproducing radiation penetrates the magnetic recordings it sees complex permeabilities, according to known theory of the permeability tensor, hence noticeable as complex impedances in the radiation circuit. Depending on the registration procedure of those impedances, either of the real components of the impedance will be registered (known as quality Q factor measurement or registration) or the imaginary components (known as absorption). The radiation of reproducing magnetic recordings according to method (D) may be produced internally in those magnetic recordings by any of the methods of this invention, for example, by direct radiation into the magnetic recordings to be reproduced, or by indirect radiation through a displacement current like the electron beam method above described in Figs. 5 and 6.

Assuming as an example, the reproduction of the magnetic recordings may be done by means of absorption measurement or registration, and using the displacement current procedure of indirect radiation, an electron beam 43 (see Fig. 8A) may be produced in a cathode ray tube 44 ending inside or outside upon a magnetic coating 45, containing the magnetic recordings to be reproduced. The electron beam may be deflected on a time base by the deflection plates 46 and also may be modulated with a constant microwave frequency by means of a microwave generator 47 and a grid 48. By use of a ground 49 and connected resistance 50 an electric circuit is completed indicating the absorption of radiation as a variable voltage at the ends 51 of the resistance and as amplified by means of the amplifier 52 and supplied to an output such as a computer through leads 52'.

As an embodiment of method (E) of this invention, the known principle of an electron optical mirror is used for reproducing the radiomagnetic recordings, either as an electronic picture employing a stream of electrons or a single electron beam, depending on the reflection of the radiomagnetic recordings in respect to the scanning electron beam.

As an example of this method of the invention as shown in Fig. 8C, an electron stream 88, generated by an electron gun 87 and modulated with a microwave carrier by means of the microwave generator 47 and the grid 48, is deflected in a cathode ray tube 28A by means of a magnetic field 89 illustrated as dots and extending perpendicular to the surface of the drawings in such a manner as to result in an electron picture on the screen 92 after being reflected from the recordings on tape 90, after passing through the electron mirror arrangement 90A employing a moving film drive 91 having the magnetic recordings thereon and then deflected by means of the magnetic field of the tube.

As another example of this method of the invention (Fig. 8D), an electron beam 93 is generated by an electron gun 87 and modulated with a microwave carrier by means of the microwave generator 47 and the grid 48 and is terminated at a narrow reproducing slit of glass or quartz 94 which is considerably thinner than the face of the tape. This slit enhances the sensitivity of the reproduction. The magnetic tape 90 passes outside the tube 28 adjacent the slit 94 by means of the film drive 91. The magnetic recordings in the tape change the deflection of the electron beam by means of the varying complex permeability of the magnetic recordings. These deflections of the electron beam are registered upon a grid 95 effecting voltage variations across the grid resistance 96 and amplified by amplifier 97 supplying output 97'.

As an embodiment of method (F) of this invention, radiomagnetic reproduction may be accomplished by the inverse of the method (C) of this invention (see Fig. 8E), using a pick-up coil 84 surrounding the ferromagnetic recordings on tape 85 to be reproduced, and conducting periodic electric currents of a constant frequency in the microwave range generated by the microwave generator 47. The magnetic recording varies the impedance of the coil 84 which is reflected as a variable voltage across the output resistor 50 to which amplifier 98 is connected.

The principles of this invention may be further explained by application to a radiomagnetic television recorder and reproducer. A radiomagnetic television recorder built according to this invention (Fig. 9) employs an electron beam 53 generated in a cathode ray tube 54 from an electron gun 55. This beam is modulated by a grid 56 with a microwave carrier from a suitable source and by another grid 57 with a video intelligence signal from a suitable source, to be recorded radiomagnetically. The horizontal sweep deflection of the beam, like in an ordinary television tube, is achieved by ordinary deflection coils or plates 58, while the vertical sweep is suppressed. The scanning beam terminates on a narrow slit 59 of glass or quartz which is very thin to pass displacement current produced by the beam and has the length of the horizontal sweep. On the outside of the tube the slit is in contact with a continuously running magnetic film 60, with the film movement in the direction shown by the arrow 61, in such a manner that the modulated electron beam produces displacement currents to ground, through the slit and the magnetic coating of the film, where the electric ground may be represented either by the metallic guide 62 backing up the magnetic film 60 or by a special conducting surface between the magnetic coating and the film base. In any instant displacement similar to electric dipoles results between the end of the electron beam and ground, producing elementary radiation inside the tape, interacting with the ferromagnetic elements of the magnetic film, said elements precessing due to premagnetization caused by an external magnetic field 63' and/or by a magnetic memory means in the tuned fashion and producing elementary radiomagnetic dots. The densities of the radiation magnetization correspond to the light densities of the television picture, resulting in a radiomagnetic picture of varying magnetic densities on the magnetic film, similar to the varying photographic densities of a photographic kinescope recording.

The electric circuitry (see Fig. 10) for example may be used for the television recorder of Fig. 9. The video signal input 63 to the circuit is divided into two branches; a synchronous separator 64 and sweep generator 64A driving the sweep of the electron beam 67 by means of the deflecting plates 66, and a modulator branch containing modulator 65 for modulating the electron beam 67. The microwave carrier from generator 68 combines with the video signal 63 in the modulator 65 and the resultant passed to grid 48 which modulates beam 67 effecting recording of the video signal radiomagnetically on the magnetic film 69 driven by means of the film drive 91.

The magnetic video recordings resulting from the television recorder above, according to this invention, are shown in Fig. 11 and Fig. 12 using U.S. television technique standards, for example, employing 35 millimeter kinescope recording of 30 frames or 60 half frames, per second. The numeral 70 (Fig. 11) designates 265 lines per half frame. Numeral 71 illustrates a magnetic video recording 35 mm. standard magnetic film 72, bearing also one or more magnetic sound tracks 73.

Continuous scanning with the given number of lines per second, analog to the television camera and receiver, produces two dimensional magnetic television recordings by means of a single recording electron beam producing radiomagnetic recording of black and white television pictures. In the case of radiomagnetic recordings of color television, according to this invention, several continuous radiomagnetic recordings are made, for example, one for each primary color. For example, radiomagnetic color television recordings may be produced either separately in space on magnetic film (for example, resulting in radiomagnetic color pictures side by side, similar to photographic color film techniques) or they may be recorded all in one picture (similar to the photographic lens raster principle), separated either by Larmor frequencies of precession or by directions of radiation magnetization, each color having its own Larmor frequency or direction of magnetization. Radiomagnetic color television recording uses equipment similar to that used in respect to recording, reproduction, sensitization, etc. of black and white video recording according to this invention.

As an example of radiomagnetic recording of color television, Fig. 13 shows an arrangement of this invention in form of a side by side recording procedure. One frame 100 only of the magnetic recording film is shown and contains three magnetic pictures 101, 102, 103 of color 1, 2 and 3, as well as one picture 104 for the black and white density contents of this frame.

Fig. 14 shows an example of a single track radiomagnetic television recording apparatus of this invention. A cathode ray tube 105 similar to that described previously is used, and four different television signals 110, 111, 112, 113 are recorded, three for each of the principal colors and one for black and white. These signals independently modulate through the modulators 114, 115, 116, 117 the electron beam 123 as deflected by the plates 124 driven by a suitable horizontal sweep. The four independent microwave generators 106, 107, 108, and 109 provide microwave carriers of differing frequencies, the values of which will be further explained. The electron beam produces radiation magnetization inside the magnetic coating of the film 90 by means of the displacement currents, as previously explained. This radiation magnetization contains four independent magnetizations, three for each principal color and one for black and white; for example, by use of a premagnetized raster (Fig. 14A) on the magnetic film 130 in such a way that, for example, parallel to the length of the film lines of sinusoidally varying premagnetizations 131 are distributed over the film. This may be accomplished, for example, by use of the apparatus of Fig. 9 sweeping the beam so that the interval varies sinusoidally. The distances of these premagnetizations are smaller than those perceptible to the human eye, and represent a raster of continuously distributed natural precession frequencies. According to the invention, these natural frequencies of precession are in the neighborhood of the four microwave carrier frequencies, fulfilling the "tuned" conditions of this invention. Hence, only those precessing elements will be magnetized radiomagnetically which correspond to a displacement of a corresponding microwave carrier frequency. This results in magnetic color pictures, for example, composed of three colors and one black and white picture for each frame, in a manner very similar to the photographic lens raster system.

The procedure for reproducing these magnetic color pictures is similar to the recording procedure using equipment similar to Fig. 14 accomplishing the absorption of the different radiation magnetizations independently registered for each precession frequency of the colors and for black and white.

As an example of reproduction of a radiomagnetic video recording, according to this invention, I use the inverse of the television recording principle of Fig. 14. This means that the magnetic film 74 (see Fig. 15) with the radiomagnetic recordings thereon is run past the scanning slit 75 of the television recording tube above described. However, differing from the recording principle, only the microwave carrier from generator 76, with constant frequency and amplitude, is applied to the scanning electron beam 77 by means of the grid 78. The microwave frequency displacement current produced by the end of the beam penetrates the magnetic film 74 on its way to ground shield 16A, resulting in radiation of the microwave frequency in the magnetic coating of the magnetic film and absorption of that radiation, which absorption at any instant varies with the magnetic densities of the radiomagnetic recordings. This results in a varying electric voltage between the ends of beam and ground, as well as at the ends of a resistance 79 in the microwave circuit of the electron beam, corresponding to the imaginary component of impedance or the imaginary component of magnetic dispersion respectively. Synchronization of the reproduction is accomplished with ordinary television techniques, by means of a synchronizing feedback control, using a synchronous separator 80 and a sweep generator 81. The voltages across the resistance 79 are amplified in the video amplifier 82 and result in the final television signal 83 after adding the synchronization pulses through the separate synchronization channel according to known techniques of television recording and reproduction. The combined video signal 83 is able to control an ordinary television receiver, thus reproducing a television picture radiomagnetically.

The radiomagnetic television recording and reproduction apparatus according to this invention avoids many problems of known television recorders and reproducers. For example, contrary to known techniques, the principle of magnetic dot recording and reproduction of this invention enables recording magnetically much smaller elements than obtained with known methods. In the case of photomagnetization, radiomagnetic dots even reach the size of the photographic scan. The synchronization of the original television signal is identical with that of the synchronization of the radiomagnetic recording and reproduction; hence, practically no phase shift error occurs. Since one picture element after the other is recorded and reproduced radiomagnetically, cross talk of known techniques is avoided. Because of the thin quartz window and the low film speed of the invention, practically no headwear can appear. Because of the use of the radiomagnetic reproduction principle with constant microwave carrier, practically no frequency equalization is necessary for reproduction, contrary to known techniques, which need a 6 db per octave equalization. The use of standard film speed in case of radiomagnetic recording and reproduction allows easiest combination with motion picture components in respect to editing, printing, etc.

The present invention contemplates the use of various magnetic recording means to achieve the new results, as for example coated magnetic tape and film, plated tape and film, homogenous magnetic tape and film, as well as special conducting shielding of the tape and film, high permeable and high coercive ferromagnetic recording material with low losses like ferrites. Furthermore, the ferromagnetic recording material is magnetically sensitized to the recording radiation frequencies by means of premagnetization as well as by molecular sensitization.

This invention has utility as a general means for all purposes of magnetic recording and reproduction, such as video recording, data recording, digital recording, magnetic storage for computers and business machines, stress and temperature recording, information recording and other recording processes, where a great number of coincidental events have to be recorded and reproduced, automation by means of magnetic tape control, radiation recording, photographic recording, etc.

It is herein contemplated to use the present invention with known processes of picture recording and reproduction, such as general picture recording and reproduction, picture cameras, picture projectors, editing machines, printers, television transcriptions, magnetic picture and sound film in motion picture studios, telewiring, wireless picture transmission, radiation recording, etc.

What is claimed is:

1. Recording apparatus comprising a cathode ray tube, a ferromagnetic coating positioned adjacent the face of said tube, magnet means for premagnetizing said coating, means for applying a carrier frequency and intelligence modulating frequency to the cathode ray of said tube, the premagnetization intensity of said magnet means being such as to substantially tune the precessional natural frequency of said coating to that of said carrier, the displacement currents generated by the impinging cathode ray beam serving to penetrate the ferromagnetic coating causing successive radiation magnetization recordings on said coating.

2. Apparatus for magnetic recording of intelligence comprising a magnetic recording medium, means for magnetizing said medium by means of radiation magnetization induced from periodic magnetic fields of radio frequency having the desired intelligence incorporated therein.

References Cited in the file of this patent

UNITED STATES PATENTS

| | | |
|---|---|---|
| 2,351,004 | Camras | June 13, 1944 |
| 2,657,377 | Gray | Oct. 27, 1953 |
| 2,700,147 | Tucker | Jan. 18, 1955 |
| 2,705,790 | Hahn | Apr. 5, 1955 |
| 2,714,714 | Anderson | Aug. 2, 1955 |
| 2,718,629 | Anderson | Sept. 20, 1955 |